United States Patent
Peterson et al.

(10) Patent No.: US 8,560,435 B2
(45) Date of Patent: Oct. 15, 2013

(54) COLLATERAL PICK-UP AND DELIVERY FOR SECURED TRANSACTIONS

(75) Inventors: Erik Peterson, Marietta, GA (US); Nagesh Kadaba, Roswell, GA (US)

(73) Assignee: United Parcel Service of America, Inc., Atlanta, GA (US)

( * ) Notice: Subject to any disclaimer, the term of this patent is extended or adjusted under 35 U.S.C. 154(b) by 744 days.

(21) Appl. No.: 12/465,991

(22) Filed: May 14, 2009

(65) Prior Publication Data

US 2010/0293089 A1  Nov. 18, 2010

(51) Int. Cl.
G06Q 40/00 (2012.01)
G06Q 40/02 (2012.01)
G06Q 10/08 (2012.01)

(52) U.S. Cl.
CPC ............... *G06Q 40/00* (2013.01); *G06Q 40/02* (2013.01); *G06Q 40/025* (2013.01); *G06Q 10/08* (2013.01)
USPC ....................................................... 705/38

(58) Field of Classification Search
CPC ..... G06Q 40/00; G06Q 40/02; G06Q 40/025; G06Q 10/08
USPC ................................... 705/38, 35
See application file for complete search history.

(56) References Cited

U.S. PATENT DOCUMENTS

| | | | |
|---|---|---|---|
| 6,385,594 B1 | 5/2002 | Lebda et al. | |
| 6,611,816 B2 | 8/2003 | Lebda et al. | |
| 2003/0036993 A1* | 2/2003 | Parthasarathy | 705/38 |
| 2003/0114206 A1* | 6/2003 | Timothy et al. | 455/575 |
| 2006/0020529 A1* | 1/2006 | Chao et al. | 705/35 |
| 2006/0224502 A1 | 10/2006 | McGowan | |
| 2006/0271918 A1* | 11/2006 | Abe | 717/131 |
| 2006/0287870 A1* | 12/2006 | Mayer et al. | 705/1 |
| 2007/0027791 A1 | 2/2007 | Young et al. | |
| 2007/0117615 A1* | 5/2007 | Van Luchene | 463/25 |
| 2007/0168278 A1 | 7/2007 | Peterson et al. | |
| 2008/0010184 A1* | 1/2008 | Abramson et al. | 705/37 |
| 2008/0052224 A1 | 2/2008 | Parker | |
| 2008/0195527 A1* | 8/2008 | Barreiro et al. | 705/38 |

OTHER PUBLICATIONS

Ma, H., & Suo, C. (2006). A model for designing multiple products logistics networks. International Journal of Physical Distribution & Logistics Management, 36(2), 127-135. Retrieved Aug. 11, 2013.*
A Guide to Personal Loans, Virgin Money (www.virginmoney.com).
Safety & Regulation: Why Your Money and Data are Safe on Zopa, pp. 1-3 (https://us.zopa.com/az/about_safety.aspx), Sep. 9, 2008.
People-to-People Loan Investment Risk vs. Reward: Lending Club, pp. 1-3 (https://www.lendingclub.com/info/about-risk.action), Sep. 9, 2008.
Frequently Asked Questions, pp. 1-6 (http://www.prosper.com/help/topics/start-faq.aspx), Feb. 3, 2009.
Chu, Kathy, "Peer-to-Peer Lending hits its stride: A Revolution in Lending," USA Today, Dec. 25, 2007.

* cited by examiner

*Primary Examiner* — Kito R Robinson
(74) *Attorney, Agent, or Firm* — Alston & Bird LLP

(57) ABSTRACT

Systems and methods for facilitating secured loan transactions are provided. Drivers of a fleet of parcel delivery vehicles associated with a particular common carrier are used to pick up collateral from a borrower to secure a loan. A driver visits the borrower's address as part of executing parcel delivery transactions to pick up the collateral. The driver may verify the borrower's identity and the validity of the collateral when receiving the collateral. An indication of the receipt of the borrower's collateral is provided to a system accessible by a lending facilitator, such as via the driver's DIAD. The indication can be used by the peer-to-peer lending facilitator to determine a level of risk associated with entering into a loan transaction with the borrower and/or an interest rate for the loan. In some cases, the collateral is delivered to a third party escrow service.

36 Claims, 7 Drawing Sheets

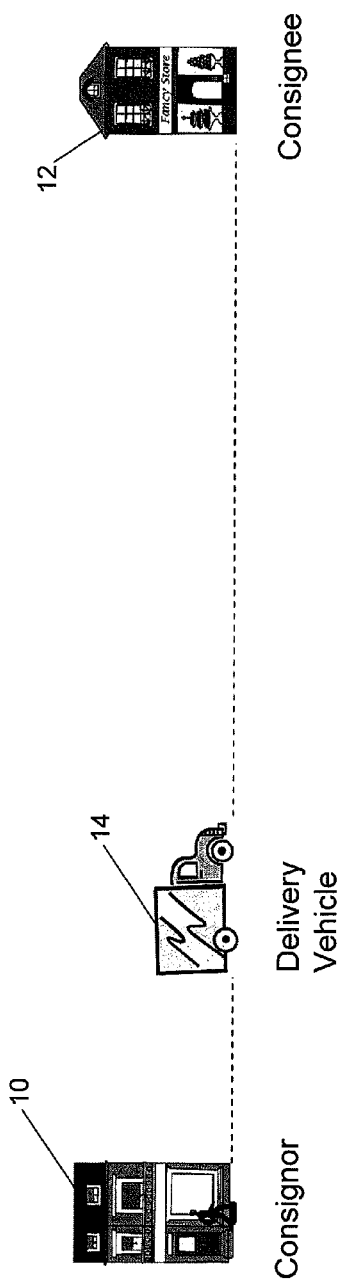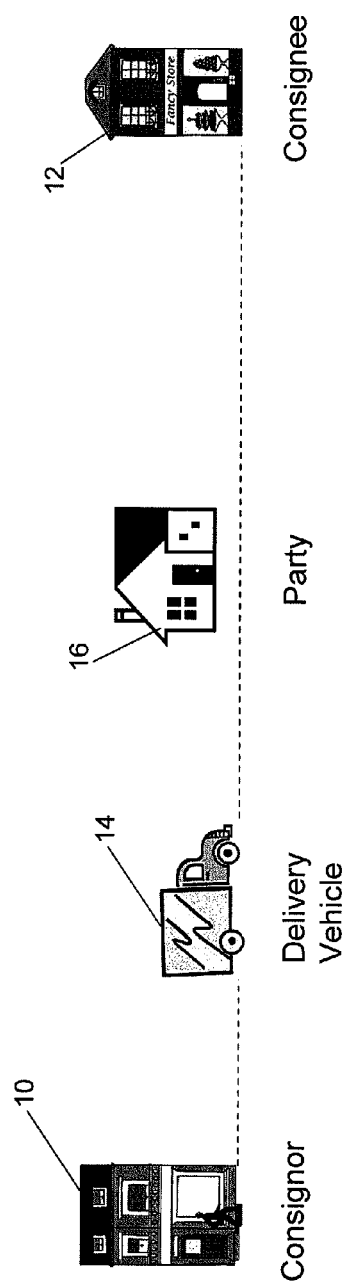

| Account No. | Consignor Name | Consignor Address | Indication of Receipt |
|---|---|---|---|
| 100 | Customer A | 123 First Rd | * |
| 101 | Customer B | 45 Main St | |
| 102 | Customer C | 6 Circle Dr | * |
| 103 | Customer D | 14 Second Rd | |
| 104 | Customer E | 23 Third Rd | |
| 105 | Customer F | 38 View St | |
| 106 | Customer G | 145 Res Row | * |
| 107 | Customer H | 202 Res Row | * |
| 108 | Customer I | 81 Fourth Rd | |
| 109 | Customer J | 17 Oval St | |
| 110 | Customer K | 1477 Route 1 | * |

FIG. 6

| Account No. | Consignor Name | Consignor Address |
|---|---|---|
| 100 | Customer A | 123 First Rd |
| 101 | Customer B | 45 Main St |
| 102 | Customer C | 6 Circle Dr |
| 103 | Customer D | 14 Second Rd |
| 104 | Customer E | 23 Third Rd |
| 105 | Customer F | 38 View St |
| 106 | Customer G | 145 Res Row |
| 107 | Customer H | 202 Res Row |
| 108 | Customer I | 81 Fourth Rd |
| 109 | Customer J | 17 Oval St |
| 110 | Customer K | 1477 Route 1 |

Secured Parties

| Account No. | Consignor Name | Consignor Address |
|---|---|---|
| 100 | Customer A | 123 First Rd |
| 102 | Customer C | 6 Circle Dr |
| 106 | Customer G | 145 Res Row |
| 107 | Customer H | 202 Res Row |
| 110 | Customer K | 1477 Route 1 |

FIG. 7

COLLATERAL PICK-UP AND DELIVERY FOR SECURED TRANSACTIONS

TECHNOLOGICAL FIELD

Embodiments of the present invention relate generally to facilitating secured loan transactions and, more particularly, relate to systems and methods for receiving collateral from borrowers for facilitating secured loan transactions.

BACKGROUND

Over the years, use of the Internet has grown to touch almost every facet of people's lives. In the business world, the Internet has been used to advertise goods and services, receive orders for products, and facilitate communication within and among businesses. The Internet has also become a place where borrowers and lenders can find each other, agree to the terms of a loan transaction, and transfer funds. Peer-to-peer lending websites have thus been developed to facilitate such transactions and to provide a forum for borrowers and lenders to conduct business.

In one type of peer-to-peer lending scenario, typically a potential borrower (e.g., an individual wishing to take out a loan) will post an amount that he wishes to borrow and a maximum interest rate he is willing to pay. In some cases, the potential borrower may include a short description of the purpose of the loan, such as to go to college, start a business, or buy a car. A potential lender (e.g., an individual who is seeking to loan money for interest) can then bid on specific loans by offering to lend the potential borrower some or all of the money requested by the potential borrower in exchange for a minimum interest rate specified by the potential lender. A third party, such as a hosting website or web forum, may then match borrowers with appropriate lenders and facilitate the transaction between the parties.

Because such peer-to-peer loan transactions occur in cyberspace, it can be difficult to fully assess the risks involved in lending money to a particular borrower. One way that such risks may be reduced is through the use of collateral to "secure" the loan. Thus, there is a need for receiving collateral from a borrower in an efficient and cost-effective manner and providing access to the collateral to potential lenders and third parties so as to facilitate loan transactions.

BRIEF SUMMARY

A system and method are therefore provided for facilitating peer-to-peer loan transactions. In particular, to facilitate a loan transaction with a borrower or potential borrower, a system and method are provided for receiving property (or certificates of title or ownership or other documents representing a right, title, or interest in property) being offered by the borrower or potential borrower as security for the loan transaction (hereinafter referred to as "collateral"). In this way, a more accurate assessment of the risk involved with engaging the party in a loan transaction may be determined based on the receipt of the borrower's collateral.

In one exemplary embodiment, a system for receiving a borrower's collateral in order to facilitate a loan transaction comprises a transportation system including a fleet of parcel delivery vehicles and a computer system. The computer system includes a data terminal, at least one server computer, and a communications network for facilitating communication between the data terminal and the at least one server computer. The data terminal is configured to receive data relating to the receipt of the borrower's collateral from an operator of at least one of the parcel delivery vehicles and to transmit the data to the server computer via the communications network. Furthermore, the server computer is configured to receive the data relating to the collateral and to communicate the data for use in facilitating the loan transaction.

In some cases, the computer system is a first computer system, and the system for receiving the borrower's collateral further comprises a second computer system configured to receive the data from the first computer system in order to facilitate the loan transaction. The second computer system may be configured to access data stored on the first computer system and to determine whether a particular borrower's collateral has been received. In addition, the first computer system may be configured to transmit at least a portion of the data including an indication of the receipt of the collateral to the second computer system. The second computer system may be configured to use at least a portion of the data received from the first computer system in order to assess the risk of engaging the borrower in a loan transaction.

In some embodiments, the computer system may include a database connected to the communications network and configured to store a plurality of data entries regarding parcel delivery transactions. Each data entry may include an indication of the receipt of the borrower's collateral. The server computer may be configured to provide the indication of receipt to the database based on the data received from the data terminal.

The data terminal may, in some cases, be a handheld device. Each data terminal may be configured to receive information instructing a driver of the respective vehicle to visit a particular address associated with the borrower and specify the collateral to be received. Furthermore, the data may affect the determination of a value associated with the level of risk involved in engaging the borrower in a loan transaction.

In some cases, the server computer may be configured to correlate the data with previously stored information obtained as a result of at least one parcel delivery transaction associated with the borrower. The server computer may also be configured to receive requests from a third party specifying the borrower from whom collateral is to be received. The server computer may be configured to transmit each request to at least one particular handheld device associated with a vehicle based on the address of the borrower with respect to the planned delivery route to be executed by the vehicle.

In another exemplary embodiment, a method and computer program product for receiving a borrower's collateral in order to facilitate a loan transaction is provided. According to the method, a fleet of vehicles is provided, and a driver of a particular one of the vehicles is instructed to drive the particular vehicle to an address associated with the borrower as part of a parcel delivery transaction. During the parcel delivery transaction, the driver receives the borrower's collateral, and information regarding the receipt of the borrower's collateral is provided to a system accessible by a lending facilitator.

In some cases, the address associated with the borrower is incorporated into the driver's parcel delivery route. The borrower's collateral may be received when a parcel is received from the borrower for shipment or delivered to the borrower at the address. For example, in a particular embodiment, the collateral may be a vehicle, and the title for the vehicle may be received when the parcel is received from the borrower or delivered to the borrower at the address.

As part of receiving the borrower's collateral, the borrower may be asked if he is involved in a loan transaction. Also, the collateral may be made accessible to a lending facilitator.

Making the collateral accessible may include delivering the collateral to a third party escrow service affiliated with the lending facilitator or delivering the collateral to the loan facilitator. In some embodiments, the borrower's identity may be validated by confirming the borrower's association with the address. Receipt of the collateral may be recorded via a handheld device.

The validity of the collateral may be verified. In one embodiment in which the collateral is property (e.g., a vehicle) and a document representing a right, title, or interest in the property (e.g., the vehicle title) is being made accessible to the lending facilitator, the verification may include visually verifying that the borrower's name matches the name on the document. In other cases, the verification may include comparing information obtained by the driver regarding the borrower as a result of receiving the collateral to information regarding the borrower as a consignor or consignee of a parcel delivery transaction.

In some embodiments, providing the information regarding the receipt of the borrower's collateral includes transmitting data to a computer system via a handheld device. The information may be provided by wirelessly transmitting the data from the handheld device to the vehicle or by wirelessly transmitting the data from the handheld device to the system. Furthermore, an indication of receipt may be provided to an entity that uses the indication to assess the risk of engaging the borrower in a loan transaction.

In some cases, a request to receive the collateral from the borrower is received. In addition, the borrower may be contacted to schedule the receipt of the collateral.

Therefore, as described below in greater detail, a system and method are provided for receiving collateral from a borrower in order to facilitate loan transactions.

BRIEF DESCRIPTION OF THE SEVERAL VIEWS OF THE DRAWING(S)

Having thus described embodiments of the invention in general terms, reference will now be made to the accompanying drawings, which are not necessarily drawn to scale, and wherein:

FIG. 1 illustrates a scenario in which a party whose collateral is to be obtained is a consignor or consignee of a parcel delivery transaction according to an exemplary embodiment of the present invention;

FIG. 2 illustrates a scenario in which a party whose collateral is to be obtained is not a consignor or consignee of a parcel delivery transaction according to an exemplary embodiment of the present invention;

FIG. 6 illustrates information in a database including an indication of the receipt of collateral according to an exemplary embodiment of the present invention;

FIG. 7 illustrates an extraction of secured borrower entries from one table to a second table according to an exemplary embodiment of the present invention.

DETAILED DESCRIPTION

Figures 3A, 3B:
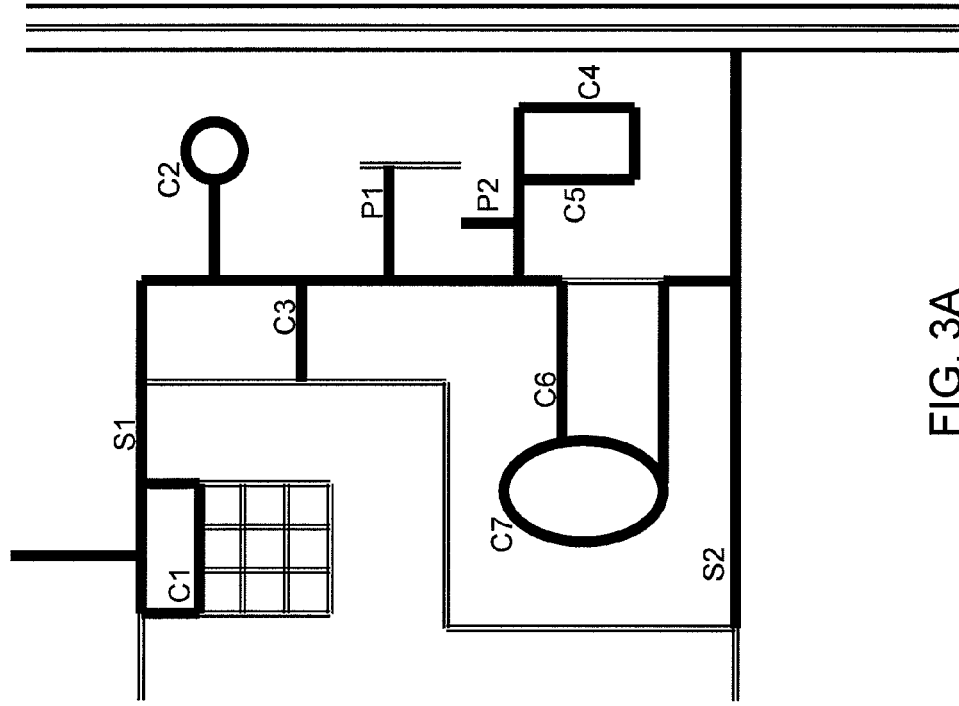
FIG. 3A depicts a delivery route according to an exemplary embodiment of the present invention.
FIG. 3B depicts the delivery route of FIG. 3A in tabular form according to an exemplary embodiment of the present invention.

Embodiments of the present invention will now be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Like reference numerals refer to like elements throughout.

Systems, methods, and computer program products of various embodiments of the present invention provide for receiving a party's collateral for facilitating secured loan transactions. In general, fleet vehicle drivers (e.g., drivers of vehicles within a fleet of parcel delivery vehicles associated with a particular common carrier) are used to collect the property being offered to secure the loan transaction or documents representing a right, title, or interest in the property (e.g., vehicle title).

The collateral, or at least an indication of the receipt of the collateral, is then made accessible to a lending facilitator, such as a peer-to-peer lending facilitator. For example, as described below, the collateral may be delivered to a third party escrow service affiliated with the lending facilitator. Alternatively, the common carrier itself may provide an escrow service. In such an embodiment, the common carrier, upon collecting the collateral, may store the collateral in its warehousing facilities while the property is being used to secure the loan. The lending facilitator may, in turn, use information regarding the receipt of the collateral to determine the risk involved with lending funds to a particular individual and may present the risk assessment and/or collateral description to potential borrowers and lenders. By providing an indication of the risk involved with loaning money to a certain individual, the lending facilitator can help potential lenders determine the appropriate amount of interest to charge and inform the lender's decision on whether to engage a particular borrower in a loan transaction.

In the past, peer-to-peer lending websites have assessed the risks (or relied on a third-party's assessment of the risks) associated with entering into a loan with a particular potential borrower based on the potential borrower's credit history and other financial data. However, when a loan transaction occurs entirely (or almost entirely) in cyberspace, some risk factors may not be easy to identify. For example, a potential borrower may misidentify himself as a different individual in order to qualify for low interest rates or to fraudulently obtain money that he has no intention of repaying. By providing for the securitization of the loan as described below, the risk of entering into a particular loan transaction "on-line" may be reduced.

At the same time, a potential borrower may wish to offer collateral to secure a loan in an effort to obtain a lower interest rate. Thus, providing a way for borrowers to easily apply collateral to a loan may provide an additional level of security to the loan and allow the loan facilitator to offer or set a lower interest rate for the loan.

According to various embodiments, collateral owned by the party (e.g., the borrower or potential borrower) is picked up from an address associated with the party. The identity of the borrower, as well as the validity of the collateral, may also be confirmed (e.g., by confirming that the address is the borrower's residence), and an indication of the receipt of the collateral may be provided to third parties. For example, once the borrower has provided collateral, he may be listed as having provided collateral to secure a current or future loan, or the name of the borrower may be made available to a third party requestor once the borrower's collateral has been received, as described more fully below. Although it is understood that various types of collateral may be received according to the described embodiments, the description that follows refers mostly to the receipt of collateral in the form of an automobile title. However, as noted above, it should be understood that the same or similar techniques could be used for receiving various other types of collateral for securing the loans of individuals or businesses. Such collateral may include, for example, real or personal property or certificates of title or ownership or other documents representing a right, title or interest in the property being offered as security for the loan transaction. For example, types of personal property that may be offered as collateral may also include coins, jewelry, musical instruments, or tools.

In various embodiments, the carrier may deliver the collateral to an escrow agent to hold in escrow while the collateral is being used to secure a particular loan. In other embodiments, the carrier may act as an escrow agent and hold the collateral in escrow while the collateral is being used to secure the loan.

Visiting the Borrower

With reference to FIGS. 1 and 2, collateral for securing a borrower's loan can be received in many ways. In some embodiments, the collateral is picked-up by the driver of one of a fleet of parcel delivery vehicles during the course of normal operation, such as when the vehicle is en route from a shipment origin (such as the consignor's address or common carrier distribution center) to a delivery destination (such as the consignee's address or common carrier distribution center). In this scenario, the borrower whose collateral is being received may be the consignor or the consignee. Alternatively, the borrower may be someone other than the consignor or the consignee, but may be located along or close to the delivery route of a particular parcel delivery vehicle, as described in greater detail below.

Borrower is a Consignor or Consignee

In some cases, the borrower whose collateral is to be received may be the consignor or the consignee in a parcel delivery transaction. In a typical parcel delivery transaction, multiple parcel delivery vehicles may be involved in transporting a parcel from the consignor to the consignee. In some cases, the parcel delivery vehicles may be owned by the same common carrier, whereas in other cases more than one common carrier may be involved. Furthermore, a single parcel delivery vehicle may pick up several parcels from several different consignors and/or deliver parcels to several different consignees. In some cases, a particular parcel delivery vehicle may pick up parcels from different consignors and deliver the parcels to a distribution center associated with a common carrier, where the parcels may be sorted and loaded onto other delivery vehicles for transportation to the various consignee locations. Similarly, a particular parcel delivery vehicle may pick up several parcels from the common carrier's distribution center and deliver the parcels to the respective consignees.

FIG. 1 depicts a simplified scenario in which a parcel delivery vehicle 14 associated with a common carrier is delivering a parcel from a consignor 10 to a consignee 12. The borrower whose collateral is to be received, in this case, may be the consignor 10 or the consignee 12. In other words, in this example, the borrower is himself either shipping or receiving a parcel. Thus, in this case, the receipt of collateral may occur at the same time that the parcel is picked up from the borrower (as consignor) for shipment, or delivered to the borrower (as consignee). In other words, because the driver is at the borrower's address to execute a delivery transaction (e.g., receive a parcel or deliver a parcel), the collateral may also be picked up during the same process of shipping or delivering the parcel.

Borrower is not a Consignor or Consignee

In FIG. 2, another scenario is depicted in which a delivery vehicle receives the collateral of a borrower who is not a consignor 10 or a consignee 12, but rather is located between or near the locations of a consignor 10 and a consignee 12. Thus, in FIG. 2, the residence of a borrower 16 is located along or close to the route of the delivery vehicle 14 as the delivery vehicle 14 travels from a consignor 10 to a consignee 12. For example, the delivery vehicle 14 in this case may be picking up one parcel from the consignor 10 and may be delivering another, different parcel to the consignee 12. Likewise, in a variation of the scenario shown in FIG. 2, the residence of the borrower 16 may be located between two consignors or two consignees as the delivery vehicle 14 picks up parcels and/or delivers parcels. Either way, the borrower 16 in these scenarios is not a consignor 10 or a consignee 12, but rather is located along/near the delivery route such that it is possible for the driver to stop at the borrower's address to pick up the borrower's collateral without substantially deviating from the driver's current scheduled delivery route.

In some cases, the address of the borrower 16 may be a planned stop on the driver's route, such that the address becomes part of the route, even though no parcel pick-ups or deliveries are scheduled to take place at that address. For example, a driver of a particular delivery vehicle may have a morning route scheduled by the common carrier that includes various parcel pick-ups and deliveries, as shown in FIGS. 3A and 3B. FIG. 3A shows a mapped route of the delivery vehicle of this example, and FIG. 3B lists the route in tabular form, showing the various stops that the delivery vehicle is to make. In the figures, the address of each consignee is designated by an alphanumeric code beginning with the letter "C;" the address of each consignor is designated by an alphanumeric code beginning with the letter "S," and the address of each borrower whose collateral is to be received is designated by an alphanumeric code beginning with the letter "P." Thus, in this particular route, there are two consignors, seven consignees, and two borrowers.

Although parcels are not being picked up from or delivered to the borrowers P1 and P2 listed on the route in FIG. 3A and FIG. 3B, the borrowers are incorporated into the route such that the delivery vehicle may stop at the address of each borrower as part of the parcel delivery activities the driver is conducting on behalf of the common carrier. Furthermore, although a borrower's address may not be directly on the delivery route, the delivery route may be modified to take into account the address of the borrower. For example, although P1 is not located on a road where any other consignors or consignees are located, the driver's route may be modified to include the address of P1 as a stop along the route, as shown.

Receiving the Borrower's Collateral

After a fleet vehicle delivery driver has arrived at the address of a borrower whose collateral is to be received, the borrower's involvement in a loan transaction and his desire to secure the loan with collateral may be confirmed. The identity of the borrower and the validity of the collateral (e.g., the ownership of the collateral by the borrower) may also be verified. An indication of the receipt of the collateral may then be provided to a system accessible by lending facilitators and third party escrow services, as described below.

Confirming the Borrower's Involvement with a Loan Transaction

As an initial matter, before taking the collateral from the borrower or otherwise receiving the borrower's collateral, the driver may confirm that the party is indeed involved with a loan transaction (e.g., signed up as a potential borrower with a peer-to-peer lending facilitator) and wishes to secure the loan by handing over collateral. In some cases, the common carrier may contact the borrower prior to the driver's arrival, such as by telephone or e-mail, to confirm the borrower's wishes as well as to set up a date for pick-up of the collateral. In any case, upon arriving at the borrower's address, the driver may ask for the person at issue. Once the person has identified himself, the driver may then ask whether the person has requested to take out a loan via the peer-to-peer website or other lending facilitator at issue and wishes to secure the loan with collateral. Then, if the answer is "yes," the driver would proceed to receive the person's collateral, as described below. Confirming the borrower's involvement with a loan transaction may thus serve to protect the person from a wrongful taking of property.

Receiving the Borrower's Collateral

Regardless of whether the borrower is a consignor or consignee of the parcel delivery transaction or is located on or near the delivery route, several things may occur when the party's collateral is received. For example, the driver of the parcel delivery vehicle may validate the borrower's identity by confirming the borrower's association with the address, as described in U.S. patent application Ser. No. 12/397,720, titled "Identity Validation for Financial Transactions," filed on Mar. 4, 2009, the contents of which are hereby incorporated by reference herein. Thus, the driver may request to see a form of identification, such as a driver's license, a picture identification card, utility bill, or a credit card that includes a picture of the individual. In this way, the driver may visually verify that the party standing before him has the same name as the individual represented on the form of identification tendered and has the same appearance as the individual pictured on the identification document. For example, the driver may confirm that the person standing before him looks like the person pictured on the borrower's driver's license and that the name printed on the driver's license matches the name of the borrower whose collateral is to be received.

In addition to validating the borrower's identity, the driver may also verify the validity of the borrower's collateral. For example, in an embodiment in which the borrower is offering a vehicle to secure the loan transaction, the driver may visually verify that the borrower's name and/or address (e.g., as provided on a parcel being shipped to the individual or otherwise provided to the driver as part of the instructions to receive collateral from the particular borrower) matches the name and/or address on the vehicle's title. The driver may also check the title for other indications, such as whether the title indicates any encumbrances (e.g., existing liens) that would reduce the value of the vehicle as collateral. In some cases, the driver may verify the information obtained by the driver regarding the borrower as a result of receiving the vehicle title with information regarding the borrower as a consignor or consignee of a parcel delivery transaction. In this regard, the common carrier may have extensive databases of information on the people and businesses that it delivers to and picks up from and may use this information to verify the validity of the title.

Providing the Indication of Receipt

Figure 4:
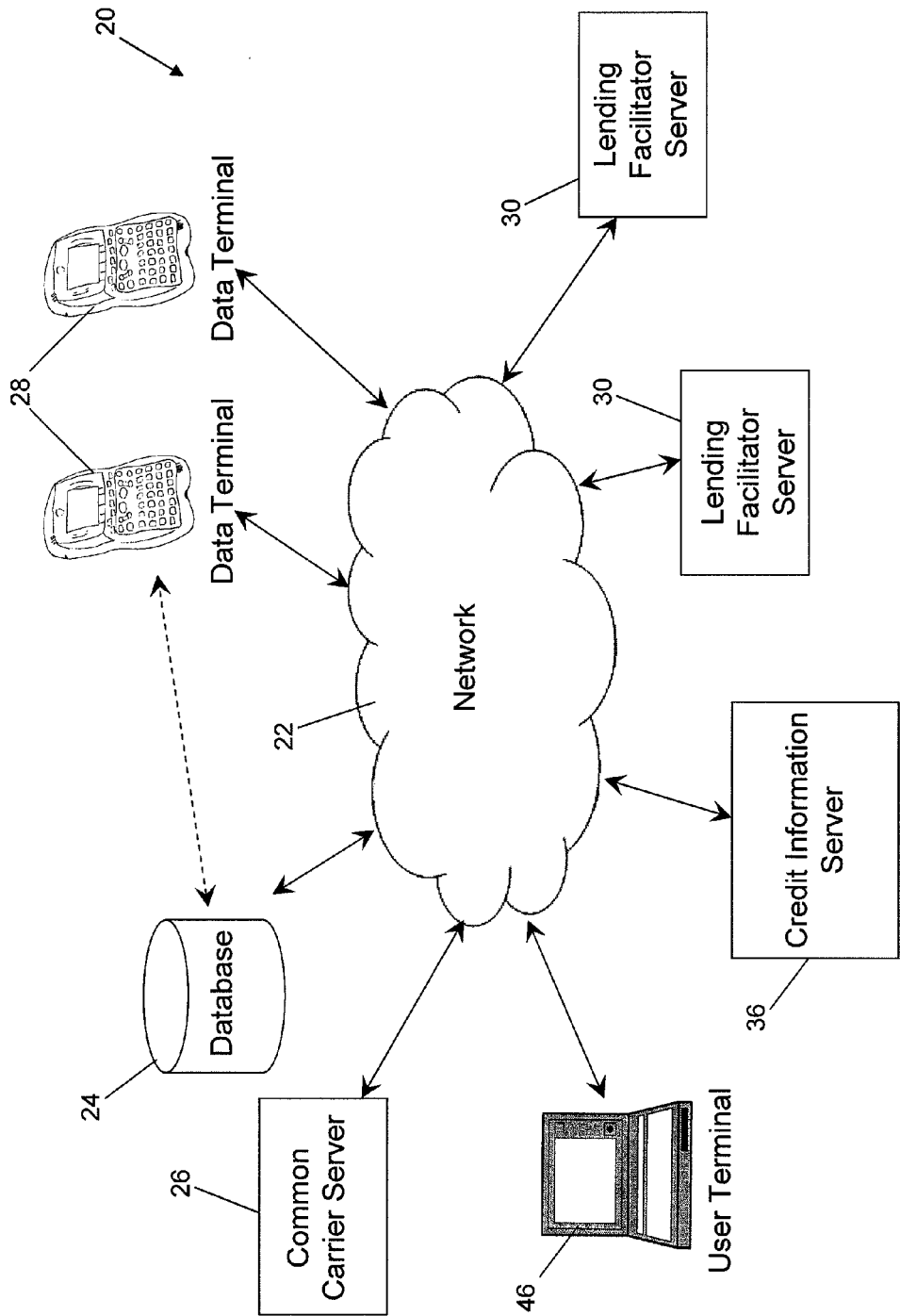
FIG. 4 is a network diagram of a system for recording receipt of a party's collateral via a network according to an exemplary embodiment of the present invention.

In some embodiments, the driver may record the receipt of the collateral by communicating and storing an indication of receipt on a system that includes various components communicating via a network, such as the network 22 shown in FIG. 4. In some cases, for example, the network 22 could be the Internet. Referring to FIG. 4, the system 20 may include a database 24 that is connected to the communications network 22 and is configured to store a plurality of data entries regarding parcel delivery transactions and/or other types of data. For example, information such as the name, address, and/or account number of consignors and consignees of the common carrier may be stored in the database 24 and maintained by the common carrier. The system 20 may also include one or more server computers 26 that are associated with a common carrier. These servers 26 may be configured to access the database 24 via the network 22 in order to update entries and manage the stored information, as necessary.

The system 20 may also include one or more data terminals 28 that are connected to the communications network 22 and are configured to receive and transmit data. The data terminal 28 may, for example, be a computer, such as a desktop or laptop computer, a cellular telephone, a barcode scanner, point-of-sale device, a personal digital assistant (PDA), an electronic signature pad, a handheld device such as a Delivery Information Acquisition Device (DIAD), or any other device configured to receive input either directly or indirectly from a user. For example, the data terminals 28 may be DIADs that are carried by drivers of a fleet of delivery vehicles of the common carrier and may be used by the common carrier to communicate with each driver, such as to provide information to the drivers regarding consignor/consignee names and addresses and, in some cases, to specify the type of collateral to be received from the borrower.

The common carrier server 26 may include and/or be in communication with one or more processors (not shown) configured to access and manipulate the data in the database 24. The server 26 may therefore be configured to access the database 24 and to provide an indication of the receipt of the borrower's collateral to the database based on the input received via the data terminals 28. The common carrier server 26 may include a memory component for storing data entries regarding parcel delivery transactions, as well as an indication of the receipt of a borrower's collateral, and/or the common carrier server 26 may communicate the information and indications to the database 24 for storage. In some cases, the database 24 is included in and forms a part of the common carrier server 26.

Figure 5:
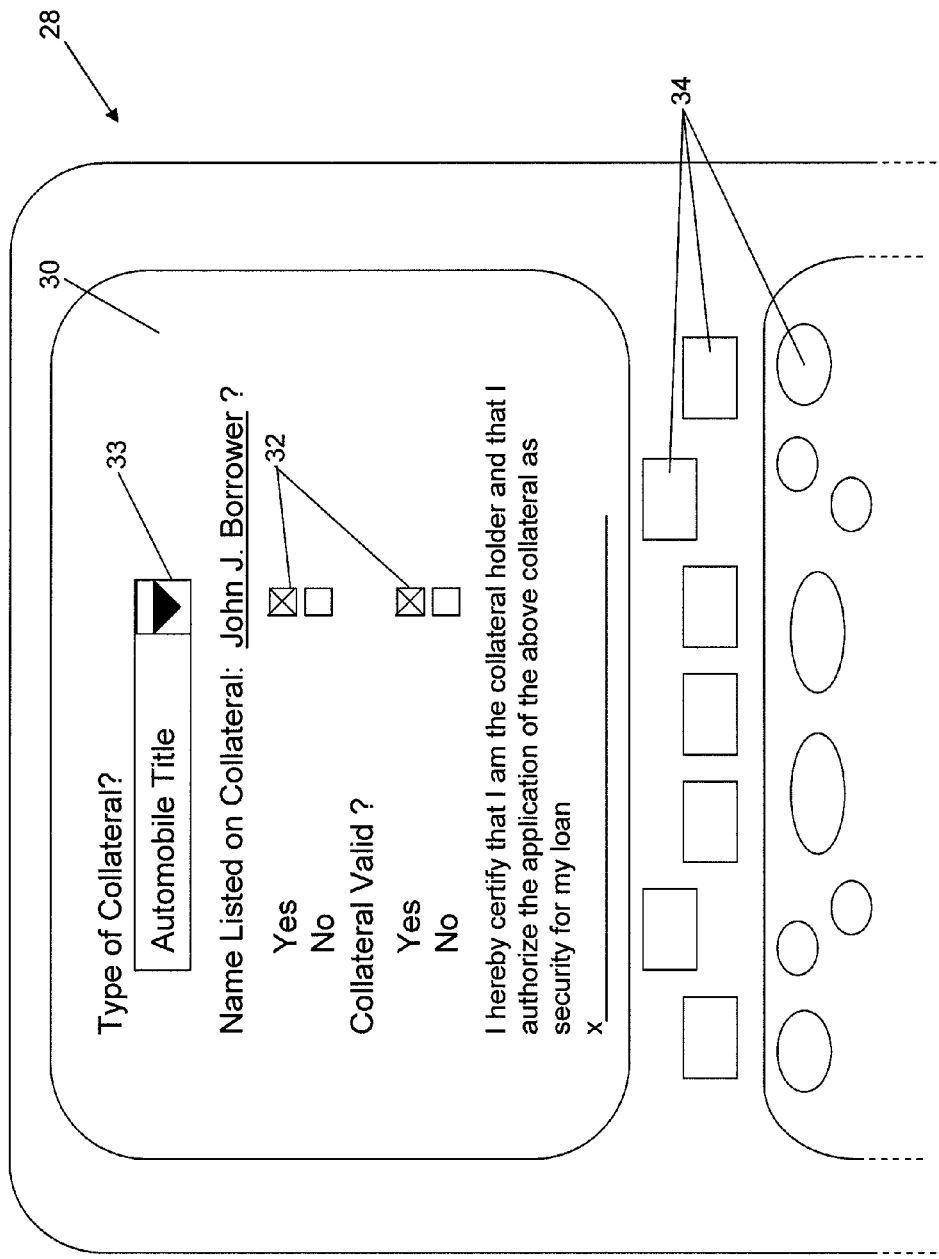
FIG. 5 illustrates a partial view of a data terminal for receiving and transmitting data according to an exemplary embodiment of the present invention.

Each data terminal 28 (e.g., each DIAD) may be configured to receive and transmit input relating to the receipt of a borrower's collateral. For example, the data terminal 28 may be configured to receive input from a driver indicating the type of collateral and/or that the information listed on the collateral (e.g., the collateral holder's name and/or address) matches the borrower's information as provided from other sources (e.g., the common carrier server 26 and/or the database 24). Referring to FIG. 5, the driver may receive a prompt on the screen 30 of the data terminal 28 upon visiting the address of a borrower that allows the driver to select the type of collateral being received. For example, various types of collateral may be listed, and the driver may be prompted to select one of them. The prompt may also ask whether the name listed on the collateral matches the name of the borrower, as shown in FIG. 5. The prompt(s) may appear automatically, for example, after receiving the party's signature on a DIAD upon receipt or delivery of a parcel if the borrower is a consignor or consignee according to FIG. 1. Alternatively, the driver may cause the prompt(s) to appear by selecting the name of a borrower from a list of scheduled stops along a route according to FIG. 2, such as the list of stops shown in FIG. 3B.

In various embodiments, the data terminal 28 is adapted to allow the driver to respond to the prompt(s) by marking a check box 32 or selecting a response from a drop down menu 33 using the keys 34 of the data terminal or other input mechanism to indicate that the borrower is indeed involved in a loan transaction and that a form of collateral, for example, was validated and received. Furthermore, the data terminal 28 may receive input regarding the type of collateral received and whether the borrower's identity and/or the validity of the collateral were verified. In addition, the data terminal 28 may be configured to receive the signature of the borrower, affirming that the collateral is valid and that the borrower has turned the collateral over to the driver. The borrower may, for example, use a stylus or other implement to sign directly on the screen of the data terminal 28, such as the DIAD.

In some cases, the data terminal 28 may include a scanner and/or digital camera. In this way, the driver is able to scan or photograph the collateral and upload the photograph to the database 24. In such an embodiment, a potential lender or his representatives is able to view the photograph of the collateral before making a final decision as to whether to loan money to the potential borrower. In one embodiment in which an automobile is being offered as security for the loan transaction, the driver may photograph the title for the automobile and/or may photograph the automobile itself.

The DIAD, barcode scanner, or other data terminal 28 may transmit the input received to the database 24 via the network 22. For example, the DIAD may transmit the data wirelessly (e.g., in real time) via a wireless computer network (e.g., via an 802.11 communications protocol), a cellular connection, or a Bluetooth® connection to another device, such as a receiver carried by a vehicle associated with the DIAD (e.g., the driver's vehicle) and/or the common carrier server 26, which may then transmit the data to the database 24. As another example, the driver's vehicle may wirelessly communicate with the DIAD or may include a cradle for docking the DIAD, in which case information received by the DIAD may be uploaded to the common carrier server 26 via the cradle or other transmitter carried by the vehicle. The data may be transmitted any other suitable way, for example, according to the common carrier's preferences.

In any case, the common carrier server 26 or other processor may be configured to receive the input (e.g., the responses of the driver to the prompts displayed on the data terminal) and to provide an indication 40 to the database 24 of the receipt of the borrower's collateral. The indication may include a designation of the borrower's collateral as "received," as shown in FIG. 6. In some cases, the indication 40 may include extraction of the particular borrower's information 42 and listing of the information in a separate database 25 or area of memory reserved for secured parties (e.g., parties from whom collateral has been received), as shown in FIG. 7. Furthermore, the data may include an image of the collateral, such as a scanned image or photograph of the vehicle and/or title for the vehicle. In some cases, the indication 40 itself may provide access to the image of the collateral. For example, the indication 40 may be a link to a picture of the collateral, such that clicking on the indication 40 allows the user to view a copy of the collateral.

The common carrier server 26 may, in some cases, be configured to correlate the input received from the data terminal 28 with data regarding one or more parcel delivery transactions associated with the borrower. For example, the server 26 may be configured to compare the information entered by driver (e.g., the collateral holder's name and address) to data already stored in the database 24 regarding the borrower as consignor or consignee (e.g., the consignee's name and delivery address, obtained as a result of previous parcel delivery transactions with the borrower as a consignee). As a result, the common carrier server 26 may be configured to determine whether the collateral is valid (e.g., whether the collateral holder and the borrower are the same) and may inform the driver via the data terminal 28.

Referring again to FIG. 6, in some cases, the database 24 may include information 42 regarding a consignor's name and address for a particular delivery that is to be conducted by the driver. When the consignor (e.g., whose collateral is to be received) turns over his collateral to the driver, the driver may transmit the name and address printed on the collateral to the common carrier server 26 by entering the name and address into the data terminal 28. The server 26 may then access the previously stored information from the database 24 and compare it to the collateral holder's information. If the consignor name matches the collateral holder's name and the consignor's address matches the collateral holder's address, for example, the server 26 may save, to the system's memory, an indication 40 of the receipt of the borrower's collateral.

Providing the Information and/or Collateral to Third Parties

Once the borrower's collateral has been received by a driver and the indication 40 of receipt has been recorded (e.g., within a database 24), the information may be accessed for use by, for example, third parties. In this regard, in various embodiments, the system 20 (or at least parts of the system 20) shown in FIG. 4 may be accessible by third-party systems that are configured to facilitate loan transactions, such as third party escrow services and peer-to-peer lending websites. In this way, a third-party loan facilitator, such as a company managing a peer-to-peer lending website, can access the collateral information and use the information to determine a level of risk associated with engaging the borrower in a peer-to-peer loan transaction (e.g., lending money to a particular borrower or borrowing money from a particular lender).

For example, referring to FIG. 4, one or more lending facilitator servers 30 may be connected to the communications network 22 and may be configured to access portions of the database 24 or common carrier server 26 to determine whether collateral has been received from particular parties. In some embodiments, the lending facilitator server 30 or common carrier server 26 may be configured to search the database for a particular borrower and determine whether the borrower's information is associated with an indication of the receipt of the collateral. In other embodiments, the common carrier server 26 may be configured to transmit information regarding "secured" borrowers to the lending facilitator server 30. Thus, the lending facilitator server 30 may incorporate the indication of receipt of the borrower's collateral (or lack thereof) as one of the factors informing the determination of a level of risk associated with the particular borrower, which may in turn affect the interest rate associated with a loan to the particular borrower.

For example, the lending facilitator server 30 may be configured to obtain financial histories and credit scores from other sources, such as a credit information server 36 maintained by a credit bureau, and may use such statistics to give a borrower a risk rating score. The lending facilitator server 30 may also be configured to determine whether the borrower has put up any collateral (e.g., by communicating with the common carrier server 26). If the collateral has been received, the lending facilitator server 30 may modify the risk rating score to reflect less risk associated with entering into a loan transaction with the borrower as the loan would be (at least partially) secured. If collateral has not been received, the lending facilitator server 30 may modify the risk rating score to reflect more risk associated with entering into the loan transaction as the loan would be unsecured.

For example, the lending facilitator server 30 may issue a score of A for Excellent, B for Good, C for Fair, and D for Poor based solely on information acquired regarding the borrower's credit risk. Upon incorporating the indication of receipt of collateral 40 recorded in the database 24 and/or transmitted by the common carrier server 26, however, the lending facilitator server 30 may modify the risk rating to A+ for those parties with Excellent credit scores and collateral, B+ for those parties with Good credit scores and collateral, and so on. The lending facilitator server 30 may also provide information regarding the collateral available to secure the loan, such as the type of collateral, the approximate market value of the collateral, and/or a photograph of the collateral, which may also affect the risk calculation.

The rating and/or other information, in turn, may be displayed on the peer-to-peer lending website such that prospective borrowers and lenders may be able to view the ratings and information associated with various borrowers listed on the website. For example, a prospective lender may operate a user terminal 46 connected (directly or indirectly) to the network 22 to view the ratings and information associated with various borrowers looking to obtain a loan. By considering the ratings along with other information describing the parties and the respective loans requested, a lender may be able to decide whether she wishes to loan an amount of money to a particular borrower.

As mentioned above, in some cases, the lending facilitator server 30 or another server in communication with the lending facilitator server 30 may be configured to calculate the value of the collateral received. By comparing the value of the collateral with the amount of the requested loan, the lending facilitator server 30 or other server may determine the percentage of the loan that is secured, which may in turn affect the risk calculation as well as the calculated interest rate for the loan.

In addition to providing the indication 40 of receipt of the collateral to third parties, the common carrier may also provide the collateral itself, such as by delivering the collateral to a third party escrow service or the lending facilitator. In this case, for example, the third party escrow service may be treated, by the carrier, as a consignee to whom the collateral is delivered as a parcel. Thus, the delivery of the collateral to the third party may be scheduled and incorporated into a driver's route in a manner similar to any other delivery to a consignee. If the collateral is delivered to a third party escrow service, the lending facilitator (such as a peer-to-peer lending website) may have access to the collateral being held by the third party escrow service such that if the borrower defaults on the loan, the lender would be able to take the collateral in an attempt to offset at least some of the losses associated with the defaulted loan. Alternatively, the common carrier may itself store the collateral, thereby acting as the escrow agent.

In some cases, the common carrier server 26 may be configured to receive requests from the third party server indicating the borrower from whom collateral is to be received. For example, the lending facilitator server 30 may transmit a request to the common carrier server 26 indicating that collateral is to be received from Mr. John J. Borrower. The request may be the result of an offer by Mr. Borrower to secure his loan in order to achieve a lower interest rate, for example. Similarly, the request may be generated to satisfy requirements for a loan as a result of a new application for a loan initiated by Mr. Borrower. For example, the request may be generated automatically when Mr. Borrower signs up on the peer-to-peer lending website to apply for a loan.

Thus, the common carrier server 26 may be configured to query the database 24 for entries matching the requested borrower. If the entries are not found, then the common carrier server 26 may be configured to transmit the request for collateral to at least one particular data terminal 28 (e.g., a DIAD) based on the address of the borrower and the planned delivery route to be executed by the user of the DIAD. The borrower may be contacted by the common carrier (such as by e-mail or telephone) to schedule the pick-up before incorporating the borrower's address into the driver's route in order to ensure that the borrower and the collateral will be available.

For example, referring to FIG. 3A, Mr. John J. Borrower may reside at 28 Oval St. (near consignee C7). Thus, in the case where an entry for Mr. John J. Borrower is not found in the database 24 (e.g., because Borrower has not turned over any collateral), the common carrier may contact Borrower to schedule a date for the pick-up. The common carrier server 26 may then incorporate a stop at Borrower's address into the driver's route for the agreed upon day, shown in FIGS. 3A and 3B, based on the proximity of Borrower's address to other addresses along the driver's route that day. In this way, the driver's route may include Borrower's address as a stop along the route, along with instructions to the driver to receive collateral from Borrower.

Figure 8:
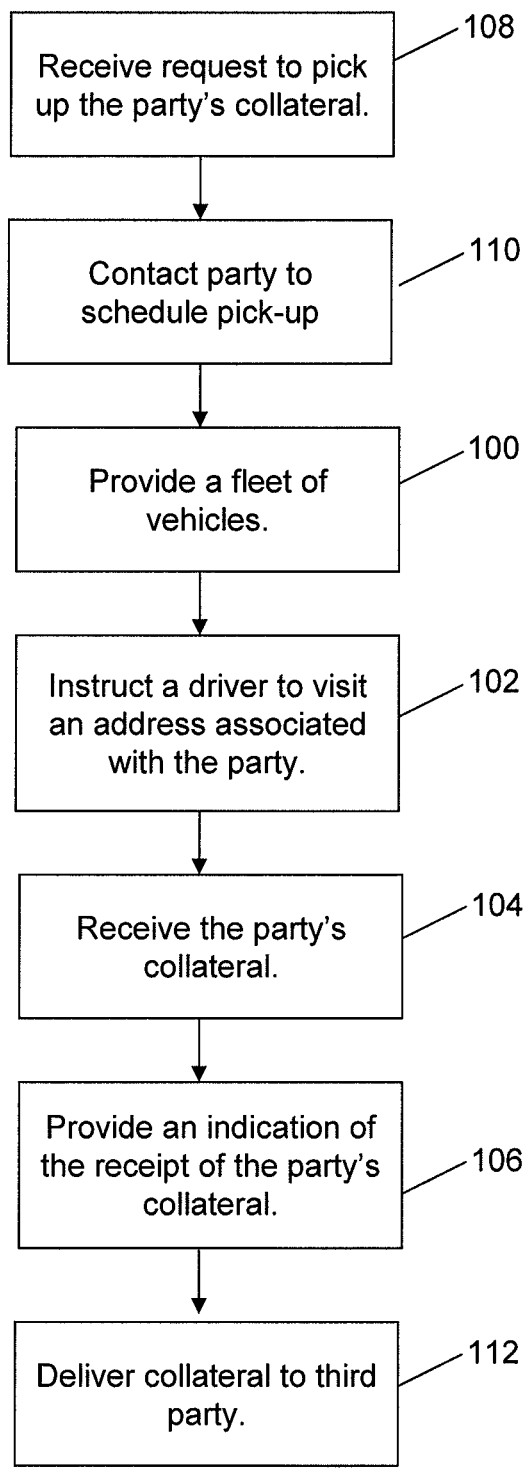
FIG. 8 is a block diagram illustrating a method for facilitating secured loan transactions according to an exemplary embodiment of the present invention.

A particular method for facilitating secured loan transactions is summarized in FIG. 8. Referring to Blocks 100 and 102 of FIG. 8, a fleet of vehicles is provided and a driver of one of the vehicles is instructed to visit an address associated with the borrower as part of a parcel delivery transaction. The address of a borrower whose collateral is to be received is then visited by the driver. As described above, the borrower may also be a consignor or consignee, and so the visit may be coincident with a parcel delivery transaction, such as the pick-up or delivery of a parcel. In other cases, the borrower may be visited as part of the execution of a delivery route, such as when the borrower is located on or near a delivery route but is not a consignor or consignee.

The borrower's collateral is then received, for example, by the driver of a parcel delivery vehicle. See block 104. When receiving the collateral, the driver, for example, may also verify the identity of the borrower and/or verify the validity of the collateral. The driver may ask the borrower if the borrower is involved with a loan transaction for which he wishes to provide collateral. In an embodiment in which the borrower is offering a vehicle as security for the loan and is providing the driver with the title for the vehicle, the driver may visually verify the borrower's name by comparing it to the name printed on the title. In some cases, the validity of the title may be verified automatically by comparing the information on the title to information regarding a consignor or consignee of a parcel delivery transaction, such as when information has previously been stored regarding the borrower as a consignor or consignee as a result of a parcel delivery transaction, as described above.

In block 106, an indication of the receipt of the borrower's collateral is provided to a third party. The third party may be a peer-to-peer website that uses the indication to assess the risk of extending a loan to the respective borrower and/or calculates an interest rate for the secured loan. In this regard, the value of the collateral may be determined and factored into the calculation of the risk and/or the interest rate. As another example, the indication may be made accessible to a server computer of a peer-to-peer lending website, which may then incorporate the indication into its assessment of the risk involved with entering into a loan transaction with the borrower, as described above. As previously described, the indication may comprise input transmitted by the driver in the previous example (e.g., via a handheld device, such as a DIAD) to a common carrier server.

In some cases, a request to pick up the borrower's collateral may be received, thereby causing a common carrier to instruct a driver to visit the address of the requested borrower. See block 108. The request may, for example, be initiated by the peer-to-peer lending facilitator. Such a request received by the common carrier server may be relayed to one or more particular drivers in the field based on the address of the borrower with respect to the driver's route. In some cases, the common carrier may contact the borrower ahead of time to schedule an appropriate date for picking up the collateral before incorporating the borrower's address into a driver's route. See block 110. In this way, the driver may visit the address and receive the collateral in response to the request without substantially deviating from the driver's scheduled delivery route while also minimizing the risk that the borrower and/or the collateral will be unavailable.

Once the collateral is received, the common carrier may deliver the collateral to a third party, such as a third party escrow service. See block 112. In this way, the third party may hold the collateral such that if the borrower defaults on the secured loan, the lender will be able to take at least some of the collateral in order to apply its value to the balance of the defaulted loan. Alternatively, the common carrier may act as the escrow service and may store the collateral in its own facilities.

The steps described above need not occur in the order shown in FIG. 8 or discussed above. Rather, the steps may occur in any order according to the configuration of the system and the preferences of the common carrier and/or peer-to-peer website administrator. For example, in some cases, the collateral may be delivered to the third party before or at the same time that the indication of receipt of collateral is transmitted. Furthermore, the methods described above may be implemented using fleets of vehicles other than fleets of delivery vehicles, for loans other than peer-to-peer loans, and in contexts other than lending. For example, the methods described above may be used by companies that provide short-term loans secured by cars or other collateral.

Many modifications and other embodiments of the invention set forth herein will come to mind to one skilled in the art to which these embodiments pertain having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A system for receiving a borrower's collateral for facilitating a loan transaction comprising:
   a transportation system including a fleet of parcel delivery vehicles; and
   a computer system comprising:
   at least one data terminal transported by at least one of the parcel delivery vehicles;
   at least one server computer; and
   a communications network for facilitating communication between the data terminal and the server computer,
   wherein:
   the data terminal is configured to receive data relating to the receipt of the borrower's collateral from an operator of at least one of the parcel delivery vehicles, and to transmit the data to the server computer via the communications network; and
   the server computer is configured to receive the data relating to the receipt of the borrower's collateral and to communicate the data for use in informing a determination of a level of risk associated with the borrower in a peer-to-peer loan transaction,
   wherein each parcel delivery vehicle is conducting parcel delivery transactions as part of a parcel delivery route in which one or more parcels are picked up from consignors or delivered to consignees,
   wherein the borrower is visited as part of carrying out the route and the borrower's collateral is distinct from the one or more parcels being picked up or delivered,
   the server computer being configured to process the data to determine the level of risk associated with the borrower in the peer-to-peer loan transaction,
   wherein the determination of the level of risk is made accessible to a lender for facilitating the lender's selection of the borrower from a number of potential borrowers to engage the borrower in the peer-to-peer loan transaction.

2. The system of claim 1, wherein the computer system is a first computer system, and wherein the system for receiving a borrower's collateral further comprises a second computer system configured to receive the data from the first computer system in order to facilitate the loan transaction.

3. The system of claim 2, wherein the second computer system is configured to access data stored on the first computer system and to determine whether a particular borrower's collateral has been received.

4. The system of claim 2, wherein the first computer system is configured to transmit at least a portion of the data to the second computer system, the data comprising an indication of the receipt of the collateral.

5. The system of claim 2, wherein the second computer system is configured to use at least a portion of the data received from the first computer system to assess the risk of engaging the borrower in a loan transaction.

6. The system of claim 1, wherein the computer system comprises a database connected to the communications network and configured to store a plurality of data entries regarding parcel delivery transactions, wherein each data entry includes an indication of the receipt of the borrower's collateral.

7. The system of claim 6, wherein the server computer is configured to provide the indication of receipt to the database based on the data received from the data terminal.

8. The system of claim 1, wherein the data terminal is a handheld computing device.

9. The system of claim 1, wherein the data terminal is configured to receive information instructing a driver of the respective vehicle to visit a particular address associated with the borrower and specifying a collateral to be received.

10. The system of claim 1, wherein the data affects the determination of a value associated with the level of risk involved in engaging the borrower in a loan transaction.

11. The system of claim 1, wherein the server computer is configured to correlate the data with previously stored information obtained as a result of at least one parcel delivery transaction associated with the borrower.

12. The system of claim 1, wherein the server computer is configured to receive at least one request from a third party specifying the borrower from whom collateral is to be received.

13. The system of claim 12, wherein the server computer is configured to transmit the request to at least one particular handheld device associated with a vehicle based on the address of the borrower with respect to the planned delivery route to be executed by the vehicle.

14. The system of claim 1, wherein the collateral comprises at least one of personal property, real property, or a document representing a right, title, or interest in the property being offered by the borrower to secure the loan.

15. The system of claim 1, wherein the server computer is configured to process the data and determine the level of risk associated with the borrower in the peer-to-peer loan transaction by communicating the data to a system accessible by a peer-to-peer lending facilitator.

16. A method of receiving a borrower's collateral in order to facilitate a loan transaction comprising:
   providing a fleet of vehicles;
   instructing a driver of a particular one of the vehicles via a handheld device to drive the particular vehicle to an address associated with the borrower as part of a parcel delivery transaction, wherein each vehicle is conducting parcel delivery transactions as part of a parcel delivery route in which one or more parcels are picked up from consignors or delivered to consignees;
   receiving, by the driver, the borrower's collateral, wherein the borrower is visited as part of carrying out the route and the borrower's collateral is distinct from the one or more parcels being picked up or delivered; and
   after said receiving step, providing via a computer network information regarding the receipt of the borrower's collateral to a system accessible by a peer-to-peer lending facilitator for use in informing a determination by a processor of a level of risk associated with the borrower, and
   processing, via a computer system, data to determine the level of risk associated with the borrower in the peer-to-peer loan transaction.

17. The method of claim 16, wherein the step of instructing the driver comprises incorporating the address into the driver's parcel delivery route.

18. The method of claim 16, wherein the step of receiving the borrower's collateral comprises receiving a parcel from the borrower for shipment or delivering the parcel to the borrower at the address.

19. The method of claim 16, wherein the step of processing the data to determine the level of risk comprises communicating the data to the system accessible by the peer-to-peer lending facilitator.

20. The method of claim 16, wherein the step of receiving the borrower's collateral comprises asking the borrower if the borrower is involved in a loan transaction.

21. The method of claim 16 further comprising making the collateral accessible to a lending facilitator.

22. The method of claim 21, wherein the step of making the collateral accessible comprises delivering the collateral to a third party escrow service affiliated with the lending facilitator.

23. The method of claim 21, wherein the step of making the collateral accessible comprises delivering the collateral to the loan facilitator.

24. The method of claim 16 further comprising validating the borrower's identity by confirming the borrower's association with the address.

25. The method of claim 16 further comprising recording receipt of the collateral via a handheld device.

26. The method of claim 16 further comprising verifying the validity of the collateral.

27. The method of claim 26, wherein the step of verifying the validity of the collateral comprises visually verifying that the borrower's name matches the name on the collateral.

28. The method of claim 26, wherein the step of verifying the validity of the collateral comprises comparing information obtained by the driver regarding the borrower as a result of receiving the collateral to information regarding the borrower as a consignor or consignee of a parcel delivery transaction.

29. The method of claim 16, wherein the step of providing the information comprises transmitting the data to the computer system via a handheld device.

30. The method of claim 29, wherein the step of providing the information comprises wirelessly transmitting the data from the handheld device to the vehicle.

31. The method of claim 29, wherein the step of providing the information comprises wirelessly transmitting the data from the handheld device to the system.

32. The method of claim 16, wherein the step of providing the information comprises providing an indication of receipt to an entity that uses the indication to assess the risk of engaging the borrower in a loan transaction.

33. The method of claim 16 further comprising receiving a request to receive the collateral from the borrower.

34. The method of claim 16 further comprising contacting the borrower to schedule the receipt of the collateral.

35. A computer program product comprising at least one non-transitory computer-readable storage medium having computer-readable program code portions stored therein, the computer-readable program code portions comprising:
   a first executable portion for providing instructions to a handheld device associated with a driver of a particular vehicle of a fleet of parcel delivery vehicles, wherein the instructions instruct the driver to drive to an address associated with a borrower as part of a parcel delivery transaction;
   a second executable portion for receiving from the handheld device information regarding receipt of the borrower's collateral by the driver; and
   a third executable portion for processing data to determine the level of risk associated with the borrower in the peer-to-peer loan transaction by communicating information regarding the borrower's collateral to a peer-to-peer lending facilitator
   wherein each parcel delivery vehicle is conducting parcel delivery transactions as part of a parcel delivery route in which one or more parcels are picked up from consignors or delivered to consignees, and
   wherein the borrower is visited as part of carrying out the route and the borrower's collateral is distinct from the one or more parcels being picked up or delivered.

36. The computer program product of claim 35 further comprising a fourth executable portion for verifying the validity of the borrower's collateral by comparing the information received from the handheld device to information regarding the borrower as a consignor or consignee of a parcel delivery transaction.

* * * * *